United States Patent
Hansson et al.

(12)

(10) Patent No.: US 10,498,126 B2
(45) Date of Patent: Dec. 3, 2019

(54) TEMPORARY LOAD SECURING DEVICE FOR AN ARMOURED HIGH VOLTAGE CABLE AND A METHOD FOR FACILITATING INSTALLATION-RELATED OPERATIONS OF AN ARMOURED HIGH VOLTAGE CABLE

(71) Applicant: NKT HV Cables GmbH, Baden (CH)

(72) Inventors: Stefan Hansson, Holmsjö (SE); Jonas Behrens, Karlskrona (SE)

(73) Assignee: NKT HV Cables GmbH, Baden (CH)

( * ) Notice: Subject to any disclaimer, the term of this patent is extended or adjusted under 35 U.S.C. 154(b) by 154 days.

(21) Appl. No.: 15/740,563

(22) PCT Filed: Jul. 3, 2015

(86) PCT No.: PCT/EP2015/065211
§ 371 (c)(1),
(2) Date: Dec. 28, 2017

(87) PCT Pub. No.: WO2017/005278
PCT Pub. Date: Jan. 12, 2017

(65) Prior Publication Data
US 2018/0198268 A1 Jul. 12, 2018

(51) Int. Cl.
H02G 15/007 (2006.01)
H02G 1/10 (2006.01)
H02G 9/02 (2006.01)

(52) U.S. Cl.
CPC ........... *H02G 15/007* (2013.01); *H02G 1/10* (2013.01); *H02G 9/02* (2013.01)

(58) Field of Classification Search
CPC ........... H02G 1/10; H02G 9/02; H02G 15/007
See application file for complete search history.

(56) References Cited

FOREIGN PATENT DOCUMENTS

| DE | 202014102569 U1 | 8/2014 |
|---|---|---|
| EP | 0499060 A2 | 8/1992 |

(Continued)

OTHER PUBLICATIONS

"Toughened Thermosets Strengthen Undersea Connectors." Machine Design, Aug. 23, 1990, p. 42. 1 page. https://business.highbeam.com/682/article-1G1-9368335/toughened-thermosets-strengthen-undersea-connectors.

(Continued)

*Primary Examiner* — Carl J Arbes
(74) *Attorney, Agent, or Firm* — Whitmyer IP Group LLC

(57) ABSTRACT

A temporary load securing device for armoured high voltage cables includes a ring flange splittable lengthwise, with first and second armour attachment surfaces for welding armour wires to the ring flange, a first tapering reinforcement member splittable lengthwise, mountable around the cable and first armour attachment surface, and arranged to be attached to a first flange surface of the ring flange, thereby extending in a first axial direction away from the first flange surface, a second tapering reinforcement member splittable lengthwise, mountable around the cable and second armour attachment surface, and arranged to be attached to a second flange surface of the ring flange, opposite to the first flange surface, thereby extending in a second axial direction, opposite to the first direction, away from the second flange surface, and a casing splittable lengthwise, and mountable around the first and second tapering reinforcement members and having engagement means for lifting the temporary load securing device.

19 Claims, 4 Drawing Sheets

(56) References Cited

FOREIGN PATENT DOCUMENTS

| | | |
|---|---|---|
| FR | 2971322 A1 | 8/2012 |
| JP | 2013150370 A | 8/2013 |
| WO | 9409245 A1 | 4/1994 |

OTHER PUBLICATIONS

International Preliminary Report on Patentability Application No. PCT/EP2015/065211 dated Sep. 27, 2017 7 pages.
International Search Report and Written Opinion of the International Searching Authority Application No. PCT/EP2015/065211 Completed: Jan. 27, 2016; dated Feb. 4, 2016 13 pages.
Written Opinion of the International Preliminary Examining Authority Application No. PCT/EP2015/065211 dated Jul. 3, 2017 7 pages.

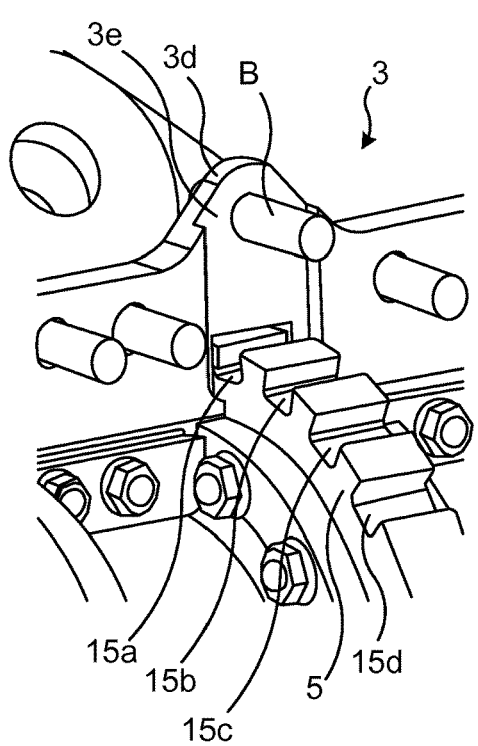
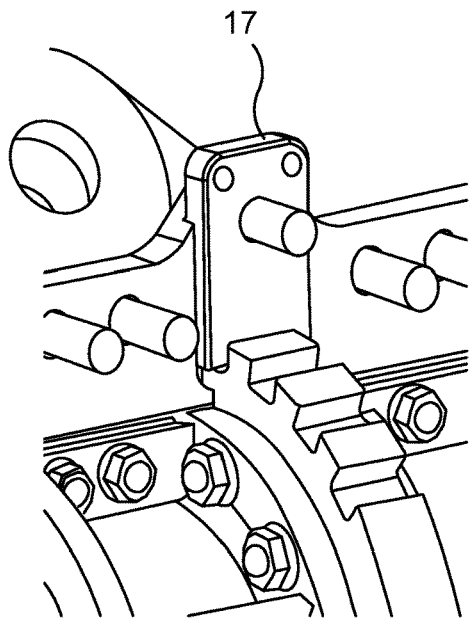
Fig. 7a
Fig. 7b
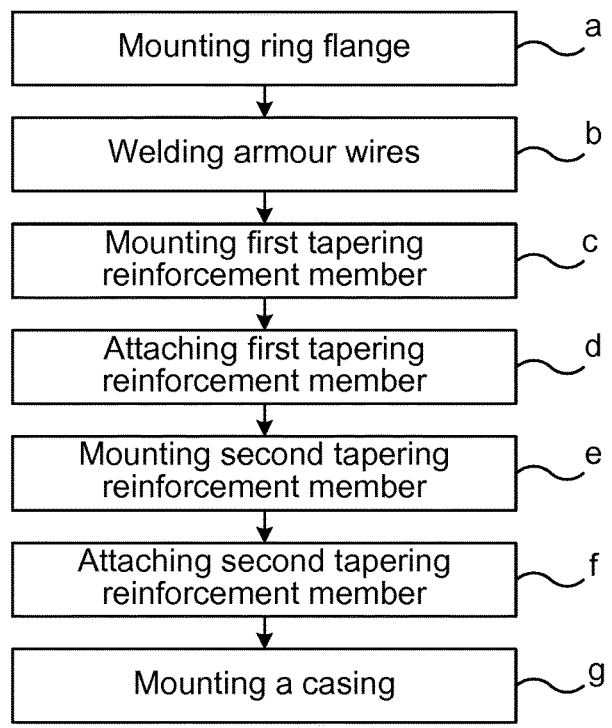
Fig. 8

TEMPORARY LOAD SECURING DEVICE FOR AN ARMOURED HIGH VOLTAGE CABLE AND A METHOD FOR FACILITATING INSTALLATION-RELATED OPERATIONS OF AN ARMOURED HIGH VOLTAGE CABLE

TECHNICAL FIELD

The present disclosure generally relates to armoured high voltage cables. In particular it relates to a temporary load securing device for armoured high voltage cables and to a method for facilitating an offshore installation procedure of armoured high voltage cables.

BACKGROUND

Subsea power cables are often brought from land to offshore installations such as oil platforms and wind turbines, in order to enable power transmission between land and sea. Such power cables are typically laid from land to the destination of installation by means of special cable laying marine vessels onto which the subsea power cable is loaded, for example onto a large cable carousel. The subsea power cable, which may have a weight of thousands of tons and a length of a number of kilometres, is successively rolled off the carousel and laid down on the ocean floor as the vessel travels towards the destination of installation.

In the process of bringing a subsea power cable offshore it may be necessary to control its axial movement and vertical position in certain situations. When the cable laying marine vessel has reached the destination of installation, it may for example be desirable to test the subsea power cable e.g. the optical transmission and power transmission capabilities of the subsea power cable, in order to ensure proper functioning prior to finalizing the installation. While performing the test, it is desirable to maintain the subsea power cable in a fixed position, in particular to restrict axial movement of the subsea power cable which may occur due to pulling forces from the weight of the majority of the subsea power cable submerged in the sea.

A second situation which could involve the necessity of controlling the axial movement of a subsea power cable is in the event that two subsea power cables are jointed offshore, for example when installing a very long subsea power cable which must be created from at least two joined subsea power cables.

For the situations mentioned above, tensioners arranged on the vessel, applying radial pressure to the subsea power cable may be used to fixate the subsea power cable. When installing a subsea power cable in deep-water i.e. depths of 500-1500 m, or ultra deep-water i.e. depths starting at 1500 m, it may however be necessary to apply very high radial forces to the subsea power cable by means of the tensioners. The high radial forces may result in that the subsea power cable becomes damaged.

A third situation which involves control of axial movement of a subsea power cable is when a subsea power cable is pulled from or onto a marine vessel, or when it is pulled onto an offshore platform for attachment to a hang-off. For this purpose, a Chinese finger is typically pulled onto the subsea power cable end, which can be coupled to a winch to enable axial movement of the subsea power cable. Chinese fingers may however not be able to hold the weight of a subsea power cable for installations in deep-water and ultra deep-water. Moreover, the installation of a Chinese finger may be cumbersome, and takes a considerable amount of time, which translates into higher costs and an increased risk of weather changes.

SUMMARY

An object of the present disclosure is to provide a temporary load securing device and a method for subsea power cable installation-related operations offshore, which solves or at least mitigates the problems of existing solutions.

Hence, according to a first aspect of the present disclosure there is provided a temporary load securing device for armoured high voltage cables, wherein the temporary load securing device comprises: a ring flange splittable lengthwise, which ring flange has a first armour attachment surface and a second armour attachment surface for welding armour wires of the armoured high voltage cable to the ring flange, a first tapering reinforcement member splittable lengthwise, designed to be mounted around an armoured high voltage cable and around the first armour attachment surface, and which first tapering reinforcement member is arranged to be attached to a first flange surface of the ring flange, thereby extending in a first axial direction away from the first flange surface, a second tapering reinforcement member splittable lengthwise, designed to be mounted around an armoured high voltage cable and around the second armour attachment surface, and which second tapering reinforcement member is arranged to be attached to a second flange surface of the ring flange, opposite to the first flange surface, thereby extending in a second axial direction, opposite to the first direction, away from the second flange surface, and a casing splittable lengthwise, which casing is mountable around the first tapering reinforcement member and around the second tapering reinforcement member, and which casing has engagement means for lifting the temporary load securing device.

With lengthwise splittable is meant along the axial direction of a component, which here corresponds to the axial direction of an armoured high voltage cable when arranged inside the temporary load securing device.

Due to the lengthwise splittable components, i.e. the ring flange, the first tapering reinforcement member, the second tapering reinforcement member and the casing, installation of the temporary load securing device may be facilitated. In particular, the components do not have to be threaded over an armoured high voltage cable; they can be directly mounted from the sides of the armoured high voltage cable.

According to one embodiment, in a mounted state the ring flange is splittable lengthwise in a first plane and each of the first tapering reinforcement member and the second reinforcement member is splittable lengthwise in a respective plane each of which is at an angle relative to the first plane. Thereby, the mechanical strength of the temporary load securing device can be further increased.

According to one embodiment the casing is rotatably engageable with the first tapering reinforcement member and the second tapering reinforcement member, to thereby enable relative rotation between the casing and the first reinforcement member and between the casing and the second reinforcement member. Torsion of the armoured high voltage cable may thereby be reduced, as the casing, which is arranged to be connected to a crane, is able to rotate relative to the armoured high voltage cable.

According to one embodiment the first tapering reinforcement member has a first circumferential groove and the second tapering reinforcement member has a second circumferential groove, wherein the casing is arranged to rotatably engage with the first circumferential groove and with the second circumferential groove to enable the relative rotation.

According to one embodiment a plurality of axial grooves is distributed along the entire periphery of the ring flange.

One embodiment comprises a locking member which is mountable to the casing and engageable with any of the axial grooves of the ring flange to lock relative rotation between the casing and the ring flange and thereby prevent relative rotation between the casing and each of the first tapering reinforcement member and the second reinforcement member. As a result, the casing may be fixated relative to the armoured high voltage cable when so desired.

One embodiment comprises a thermal protection system arranged to be mounted around the armoured high voltage cable, and wherein the ring flange is arranged to be mounted around the thermal protection system. Heat emitted during welding of the armour wires to the first armour attachment surface and to the second armour attachment surface may thereby be absorbed by the thermal protection system instead of being transmitted to the armoured high voltage cable. The armoured high voltage cable may thereby be protected from heat-related damages that could otherwise arise during welding.

According to one embodiment the first tapering reinforcement member is mountable to the first flange surface by means of a plurality of bolts and the second tapering reinforcement member is mountable to the second flange surface by means of plurality of bolts.

According to a second aspect of the present disclosure there is provided a method for facilitating installation-related operations of an armoured high voltage cable, wherein the method comprises: a) mounting a ring flange that is split lengthwise around an armoured high voltage cable, b) welding armour wires of the armoured high voltage cable to a first armour attachment surface of the ring flange and welding armour wires of the armoured high voltage cable to a second armour attachment surface of the ring flange, c) mounting a first tapering reinforcement member that is split lengthwise, around the first armour attachment surface, d) attaching the first tapering reinforcement member to a first flange surface of the ring flange, whereby the first tapering reinforcement member extends in a first axial direction away from the first flange surface, e) mounting a second tapering reinforcement member that is split lengthwise, around the second armour attachment surface, f) attaching the second tapering reinforcement member to a second flange surface of the ring flange, opposite to the first flange surface, whereby the second tapering reinforcement member extends in a second axial direction, away from the second flange surface, and g) mounting a casing, having engagement means for lifting the temporary load securing device and which casing is split lengthwise, around the first tapering reinforcement member and around the second tapering reinforcement member.

One embodiment comprises attaching to the engagement means a first hook of a crane and attaching a second hook of a crane.

One embodiment comprises holding the armoured high voltage cable by means of the crane.

According to one embodiment, in steps c) and e) each of the first tapering reinforcement member and the second tapering reinforcement member is mounted to be splittable lengthwise in a respective plane each of which is at an angle relative to a first plane in which the ring flange is splittable lengthwise.

According to one embodiment a plurality of axial grooves is distributed along the entire periphery of the ring flange, and wherein the method comprises mounting a locking member onto the casing, and engaging the locking member with an axial groove to lock relative rotation between the casing and the ring flange and thereby prevent relative rotation between the casing and each of the first tapering reinforcement member and the second reinforcement member.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise. Moreover, any steps of the method presented herein need not necessarily be performed in the described order, unless explicitly stated so.

BRIEF DESCRIPTION OF THE DRAWINGS

The specific embodiments of the inventive concept will now be described, by way of example, with reference to the accompanying drawings, in which:

FIGS. 7a and 7b show a detail of an example of a temporary load securing device having a locking member; and FIG. 8 shows a method of facilitating installation-related operations of an armoured high voltage cable.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

The present disclosure relates to temporary load securing device for an armoured high voltage cable, e.g. an armoured high voltage power cable such as a subsea power cable. The temporary load securing device is intended to only temporarily enable securing of an armoured high voltage cable, for example during the installation procedure of the armoured high voltage cable. In contrast to hang-off devices, which enable permanent attachment of an armoured high voltage cable, to an installation, the temporary load securing device is designed to enable temporary load securing in order to enable installation-related manoeuvring of the armoured high voltage cable. The temporary load securing device is designed to be attached to a manipulation device such as a crane only when the armoured high voltage cable is handled during installation thereof. The movement of the armoured high voltage cable may thereby be controlled during the installation procedure. The temporary load securing device may be utilised both for radial and axial lifting/manoeuvring of an armour high voltage cable. Although the temporary load securing device, or at least parts thereof, may be attached to an armoured high voltage cable also when the armoured high voltage cable has been installed, the temporary load securing device is not in use after installation.

Each component, of the temporary load securing device, that is designed to be fitted around an armoured high voltage cable is splittable lengthwise so that the temporary load securing device may be mounted around an armoured high voltage cable without having to thread any component onto the armoured high voltage cable. The temporary load securing device may hence be assembled onto an armoured high voltage cable by mounting its components from the sides of the armoured high voltage cable. This substantially facilitates the mounting of the temporary load securing device.

Examples of a temporary load securing device will now be described in more detail with reference to FIGS. 1-7b.

Figure 1:
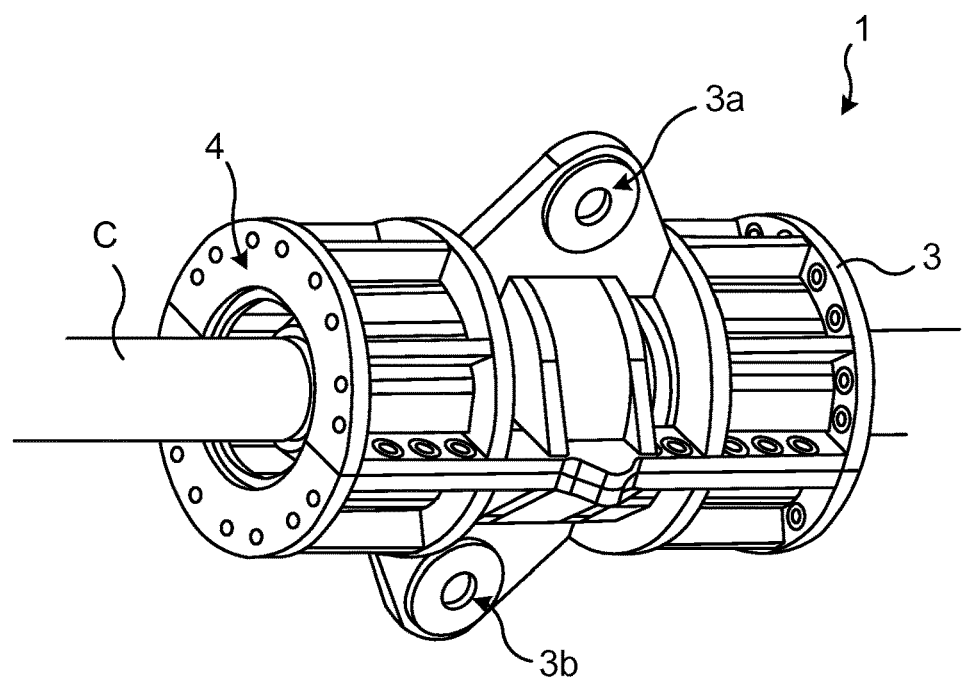
FIG. 1 shows a perspective view of an example of a temporary load securing device arranged around an armoured high voltage cable.

FIG. 1 shows an example of a temporary load securing device 1. In the illustrated example, the temporary load securing device 1 is arranged around and secured to an armoured high voltage cable C. The temporary load securing device 1 comprises a casing 3 that is splittable lengthwise and which casing 3 has engagement means for lifting the temporary load securing device 1. The engagement means has/have very high mechanical strength, and is designed to carry high tensile forces, for example up to 110 metric tonnes or more. This ensures that cable laying procedures in which the armoured high voltage cable is manoeuvred by means of the temporary load securing device 1 would be possible at water depth of more than 1000 metres. The engagement means according to the present example are realised by means of a first lifting lug 3a and a second lifting lug 3b, although other variations could also be possible; the engagement means could for example be lugs or hooks.

The casing 3 may according to one variation have attachment means 4 at one or both of its end faces at its two lateral ends. The lateral ends are those ends that define the two mouths of the through-opening extending through the casing 3, for receiving an armoured high voltage cable. The attachment means 4 may for example be formed of a plurality of openings, arranged circumferentially around a mouth, for receiving bolts. Bend stiffeners or bend restrictors may be attached to the casing 3 via the attachment means 4.

Figure 2:
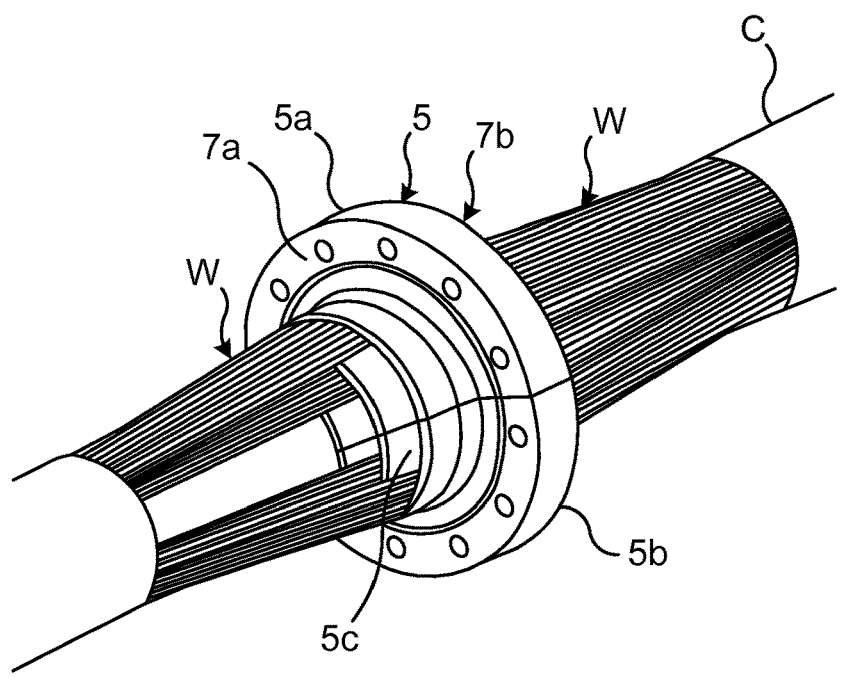
FIG. 2 is a perspective view of an example of a ring flange of a temporary load securing device, arranged around an armoured high voltage cable.

As can be seen in FIG. 2, the temporary load securing device 1 comprises a ring flange 5 which is mountable around an armoured high voltage cable C. The ring flange 5 is splittable lengthwise into a first ring flange part 5a and a second ring flange part 5b. The ring flange 5 can thereby be fitted in a simple manner around the armoured high voltage cable C. According to one variation, the ring flange 5 is splittable into two halves, i.e. the first ring flange part 5a and the second ring flange part 5b are two halves forming the ring flange 5. It is however to be noted that it is envisaged that according to other variations the ring flange could be lengthwise splittable in more than two parts.

The ring flange 5 has a first flange surface 7a and a second flange surface 7b opposite to the first flange surface 7a. The first flange surface 7a and the second flange surface 7b are radially extending or essentially radially extending surfaces.

Figure 4:
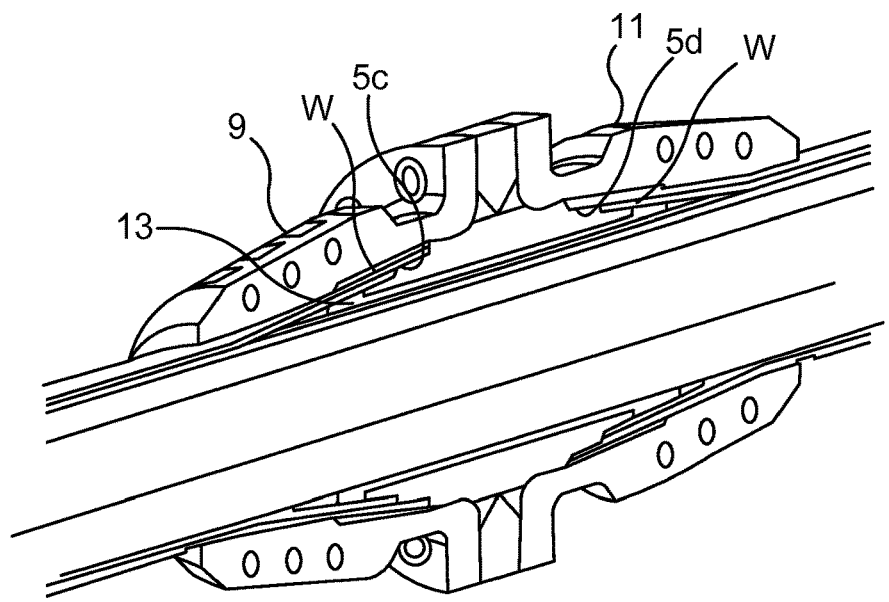
FIG. 4 shows a section along the central axis of the arrangement in FIG. 3.

The ring flange 5 furthermore has a first armour attachment surface 5c and a second armour attachment surface 5d, shown in FIG. 4. The first armour attachment surface 5c extends in a first axial direction and is arranged to enable welding of armour wires W of an armoured high voltage cable C thereon. The second armour attachment surface 5d extends in a second axial direction, opposite to the first axial direction, and is arranged to enable welding of armour wires W of an armoured high voltage cable C thereon. The first armour attachment surface 5c and the second armour attachment surface 5d define a respective external surface of the ring flange 5 and the armour wires W are hence arranged to be placed on top of the first armour attachment surface 5c and on top of the second armour attachment surface 5d.

Each of the first armour attachment surface 5c and the second armour attachment surface 5d may have the structure of a stair-like arrangement with the steps of the first armour attachment surface 5c increasing in height in a direction towards the second armour attachment surface 5d. The same could in this variation apply to the second armour attachment surface 5d, i.e. the steps of the second armour attachment surface 5d may increase in height in a direction towards the first armour attachment surface 5c. Thereby several layers of armour wires may be welded to the first armour attachment surface 5c and to the second armour attachment surface 5d. In particular, the layers of armour wires may be welded in a manner in which the innermost layer is welded to the lowest step, and the next layer to the next step, and so on if there are more than two layers of armour wires W.

In the example shown in FIG. 2, the armour wires W are attached to the first armour attachment surface 5c and to the second armour attachment surface 5d, shown in FIG. 4. In particular, armour wires of an inner armour layer are welded to a first step of the first armour attachment surface 5c and to a first step of the second armour attachment surface 5d. Armour layers of an outer armour layer are welded to a second step, subsequent to the first step, of the first armour attachment surface 5c and to a second step, subsequent to the second step, of the second armour attachment surface 5d. A portion of armour wires has been cut away to better illustrate the structure of the ring flange 5.

Figure 3:
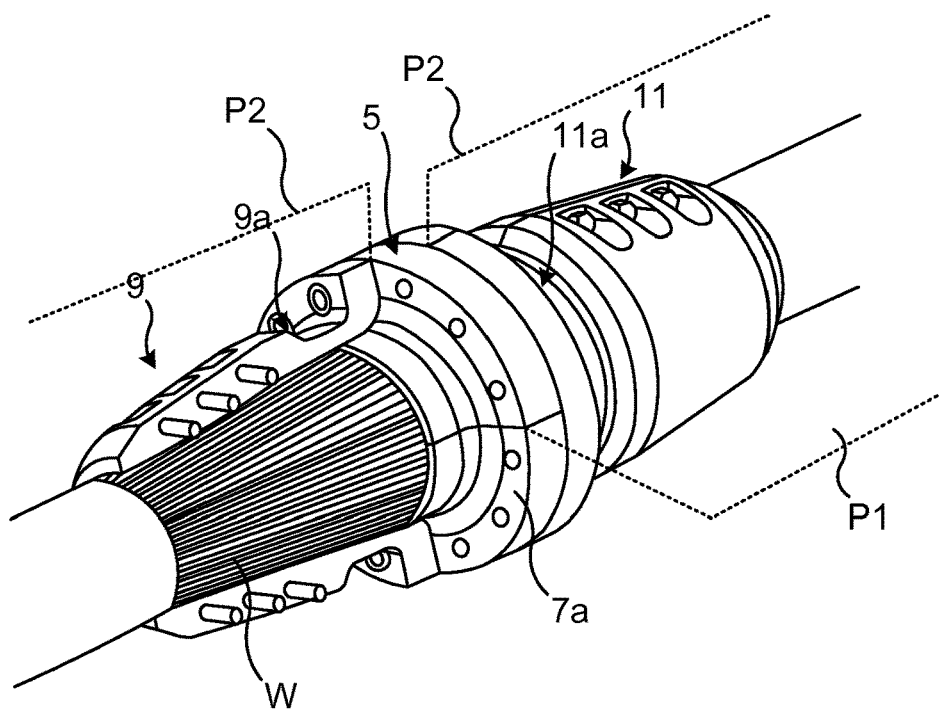
FIG. 3 is a perspective view of a ring flange and a first tapering reinforcement member and a second tapering reinforcement member arranged around an armoured high voltage cable.

FIG. 3 shows the next layer of the temporary load securing device 1 shown in FIG. 1. The temporary load securing device 1 thus further comprises a first tapering reinforcement member 9 and a second tapering reinforcement member 11. The first tapering reinforcement member 9 is splittable lengthwise and arranged to be mounted to the first flange surface 7a of the ring flange 5. The first tapering reinforcement member 9 is arranged to be fixedly mounted to the ring flange 5, thereby preventing relative rotation between these two components. The first tapering reinforcement member 9 may for example mounted to the ring flange 5 by means of a plurality of nuts and bolts.

According to one variation, the first tapering reinforcement member 9 is lengthwise splittable into two halves. However, it is envisaged that the first tapering reinforcement member could be splittable lengthwise into more than two parts. In a mounted state the first tapering reinforcement member 9 extends in a first axial direction away from the first flange surface 7a. The first tapering reinforcement member 9 is arranged around the first armour attachment surface 5c when in an assembled state. Armour wires W are thus sandwiched between the first tapering reinforcement member 9 and the first armour attachment surface 5c.

The second tapering reinforcement member 11 is splittable lengthwise and arranged to be mounted to the second flange surface 7b of the ring flange 5. The second tapering reinforcement member 11 is arranged to be fixedly mounted to the ring flange 5, thereby preventing relative rotation between these two components. The second tapering reinforcement member 11 may for example mounted to the ring flange 5 by means of a plurality of nuts and bolts.

According to one variation, the second tapering reinforcement member 11 is lengthwise splittable into two halves. However, it is envisaged that the second tapering reinforcement member could be splittable lengthwise into more than two parts. In a mounted state the second tapering reinforcement member 11 extends in a second axial direction, opposite to the first axial direction, away from the second flange surface 7b. The second tapering reinforcement member 11 is arranged around the second armour attachment surface 5d when in an assembled state. Armour wires W are thus sandwiched between the second tapering reinforcement member 11 and the second armour attachment surface 5d. When all three components are assembled, the ring flange 5 is centred between the first tapering reinforcement member 9 and the second reinforcement member 11. In this case all of these three components extend along a common axis defined by armoured high voltage cable around which they are mounted.

Each of the reinforcement members 9 and 11 is tapering so as to ensure that they bear against the armour wires W which give the armoured high voltage cable a conical shape in the section of the armoured high voltage cable where the armour wires W have been welded onto the first armour attachment surface 5c and the second armour attachment surface 5d.

According to one variation, in a mounted state the ring flange 5 is splittable lengthwise in a first plane P1 and each of the first tapering reinforcement member 9 and the second reinforcement member 11 is splittable lengthwise in a respective plane P2 each of which is at an angle relative to the first plane P1. This further increases the mechanical strength of the temporary load securing device 1. The first plane P1 hence intersects each of the planes P2. As an example, the angle between the first plane P1 and the planes P2 may be in the range 10-90 degrees, for example 45-90 degrees, or about 90 degrees or 90 degrees. The casing 3 is arranged to be mounted around the first tapering reinforcement member 9 and around the second tapering reinforcement member 11. The casing 3 may be rotatably engageable with the first tapering reinforcement member 9 and with the second tapering reinforcement member 11 to thereby enable rotation of the casing 3 relative to the first tapering reinforcement member 9 and relative to the second tapering reinforcement member 11.

In order to enable relative rotation, according to one variation, the first tapering reinforcement member 9 may have a first circumferential groove 9a extending along the periphery of the first tapering reinforcement member 9. The second tapering reinforcement member 11 may have a second circumferential groove 11a extending along the periphery of the second tapering reinforcement member 11. The casing 3 may be arranged to rotatably engage with the first circumferential groove 9a and with the second circumferential groove 11a to enable the relative rotation.

The temporary load securing device 1 may comprise a thermal protection system 13 mountable around the armoured high voltage cable C, as shown in FIG. 4. The thermal protection system 13 may also be splittable lengthwise so as to enable simple assembly onto the armoured high voltage cable C. The thermal protection system 13 may according to one variation be splittable lengthwise into two halves. According to one variation the thermal protection system may be splittable lengthwise into more than two parts. The thermal protection system 13 may be placed under the armour wires W, which armour wires W are bent radially outwards during assembly such that the armour wires W may be placed on the first armour attachment surface 5c and the second armour attachment surface 5d. In a mounted state the ring flange 5 is arranged around the thermal protection system 13. The thermal protection system 13 is essentially a sleeve and can absorb heat emitted from the ring flange 5 when the armour wires W are welded thereto. In this way the interior of the armoured high voltage cable may be protected from heat emitted during welding. The thermal protection system 13 may for example be made of a suitable plastic or any other thermally insulating material.

According to one variation the first tapering reinforcement member and the second tapering reinforcement member may have a respective radial through-opening to enable injection of a compound into the space which includes the welded armour wires W. The compound may be solidified inside this space, between armour wires W, so as to additionally provide strength to the assembly. The compound may for example be an anti-corrosion compound.

According to one variation, a temperature sensor may be arranged in for example an indentation of the thermal protection system. This sensor may be arranged with either wired or wireless communication means to transmit measurement signals to a temperature indicator outside the temporary load securing device. By means of monitoring the temperature during welding, it may be ensured that the armour high voltage cable is not thermally damaged during welding of the armour wires W.

Figure 5:
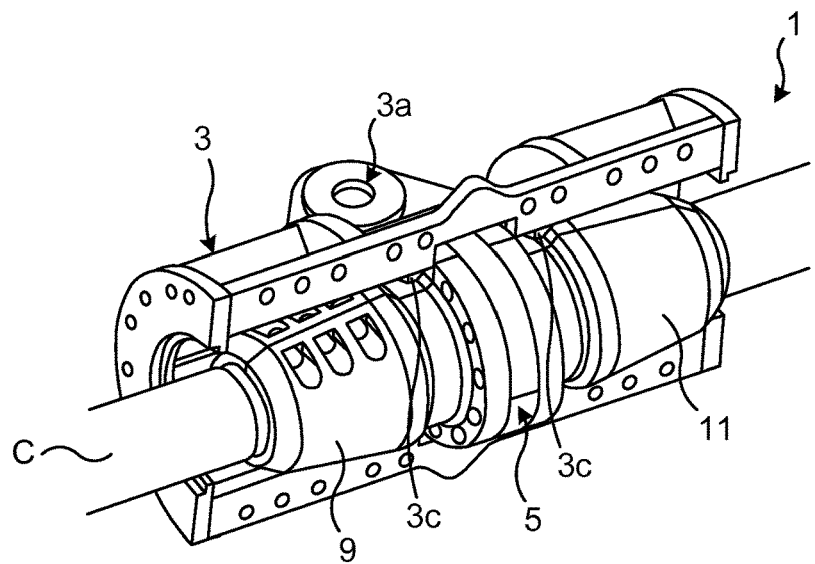
FIG. 5 shows a perspective view of a temporary load securing device, including a lengthwise splittable casing of which one part is arranged around a first tapering reinforcement member and around a second tapering reinforcement member.

FIG. 5 shows the temporary load securing device 1 with one half of the casing being removed to expose the interior of the temporary load securing device 1. According to the example, the casing 3 may be splittable lengthwise into a first casing part, shown in FIG. 5, and a second casing part. The first casing part and the second casing part may form a respective half of the casing 3. It is however envisaged that according some embodiments, the casing could be lengthwise splittable into more than two parts.

According to one variation, the casing 3 is not fixed to any of the internal components of the temporary load securing device 1, i.e. it is not fixed to any of the ring flange 5 and the first tapering reinforcement member 9 and the second tapering reinforcement member 11. Only the lengthwise splittable parts of the casing 3 are assembled with each other. The casing may thereby be allowed to rotate relative to the internal components of the temporary load securing device 1.

According to the example shown in FIG. 5, the casing 3 has two internal engagement members 3c, each being arranged to be received in a respective one of the first circumferential groove 9a and the second circumferential groove 11a of the first tapering reinforcement member 9 and the second tapering reinforcement member 11 to enable relative rotation.

According to one variation, the first circumferential groove and the second circumferential groove, as well as the engagement members, may be provided with a low-friction material, e.g. by means of a coating, or by means of some kind of bearings to reduce the friction between these components, and thus to reduce the wear.

Figure 6:
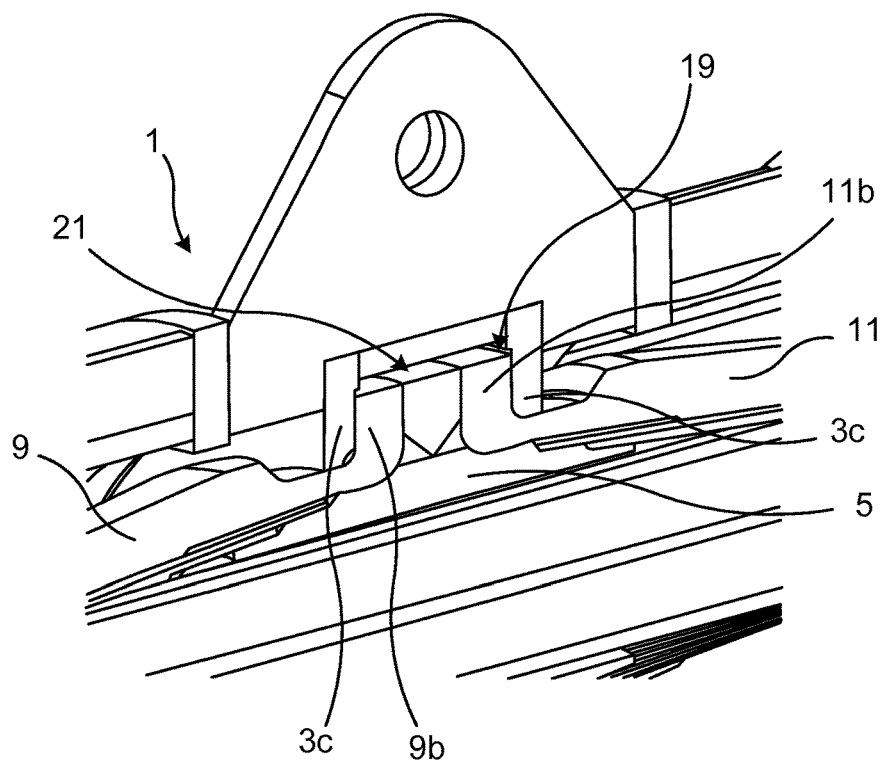
FIG. 6 shows an axial section of a detail of an example of a temporary load securing device.

According to one variation, as depicted in FIG. 6, the engagement members 3c may be arranged at a respective side of the bolt connection 19 between the ring flange 5 and the first tapering reinforcement member 9 and the second tapering reinforcement member 11. Each engagement member 3c may for example extend along the entire inner circumference of the casing 3. The bolt connection 19, which is formed by the first flange surface 7a, the second flange surface 7b and corresponding flange ends 9b, 11b of the two tampering reinforcement members 9 and 11 forms a central heel 21 extending circumferentially. The engagement members 3c on the other hand define a circumferential groove between them, extending along the inner surface of the casing 3, in which the bolt connection 19 is receivable with only a slight play. This design may be implemented for any type of engagement member for lifting the temporary load securing device, i.e. it does not have to comprise lifting lugs as depicted in FIG. 6.

Beneficially, due to the design described in the previous paragraph, during use, the load will be transmitted from the lifting lugs to the armour wires via the casing 3, the first tapering reinforcement member 9, the second tapering reinforcement member 11 and finally the ring flange 5. The bolt connection between the ring flange 5 and the two reinforcement members 9 and 11 will however not be subjected to tensional forces applied to the temporary load securing member 1 by the weight of the armour high voltage cable.

The first lifting lug 3a and the second lifting lug 3b are arranged at the external surface of the casing 3, and arranged to engage with lifting means such as hooks, of e.g. a crane to thereby enable actuation of the armoured high voltage cable fitted in the temporary load securing device 1. The first lifting lug 3a and the second lifting lug 3b are preferably arranged at 180 degrees angle along the external surface of the casing, to provide a symmetric load distribution. It should be noted that the casing 3 may according to one variation comprise more than two lifting lugs, for example four or eight lifting lugs. In general, the lifting lugs are arranged in a rotational symmetric manner.

According to one variation, the lengthwise splittable parts of the casing may be mounted by means of bolts. Furthermore, according to one variation, the lengthwise splittable parts may be hingedly mounted to each other at one end at which they are lengthwise splittable, and at the other end at which they are lengthwise splittable they may be mountable to each other by means of bolts or some other suitable kind of locking mechanism. The casing may thus be opened and closed in a hinged manner.

According to one variation, the casing 3 may be fixated relative to the first tapering reinforcement member 9 and relative to the second tapering reinforcement member 11 to thereby temporarily prevent relative rotation. FIGS. 7a and 7b shows an example of a locking mechanism which provides this functionality. According to this example, the ring flange 5 has a plurality of axial grooves 15a-15d distributed along the entire circumference of the flange portion of the ring flange. The casing 3 has a portion 3d which in a mounted state extends across the flange portion. The portion 3d of the casing 3 may have a radial cut-out 3e where the portion 3d is able to receive a locking member 17 therein when the casing 3 is to be locked to the ring flange 5. The temporary load securing device 1 may thus comprise a locking member 17 which is arranged to be fitted in the cut-out 3e such that it extends into an axial groove 15a-15d. The locking member 17 may have a through-opening and may be locked in this position by means of for example a bolt B extending through the portion 3d and into an opening in the locking member 17. According to the example, in order to fit the locking member 17 into an axial groove 15a-15d, the bolt B is first removed, wherein the locking member 17 is placed in the cut-out 3e and in the axial groove 15a-15d, and wherein the locking member 17 is fixed with the bolt B. The casing 3 is thereby prevented to rotate relative to the ring flange 5. Since in an assembled state the first tapering reinforcement member 9 and the second tapering reinforcement member 11 are fixedly arranged to the ring flange 5, the casing 3 is also prevented from rotation relative to the reinforcement members 9 and 11.

A method of mounting the temporary load securing device 1 around an armoured high voltage cable will now be described with reference to FIG. 8.

First, the armoured high voltage cable is prepared in a suitable manner. This includes peeling off the external sheath of the armoured high voltage cable around the entire periphery to expose the armour wires. The armour wires are then cut along the periphery of the armoured high voltage cable at two locations where the external sheath has been peeled off. A section without armour wires is thereby created. The cut armour wires may then be bent radially outwards.

In a step a) the ring flange 5 is mounted around an armoured high voltage cable C, in particular around the section that is free from armour wires. At this point, the ring flange 5 is in a state in which it is split lengthwise, and the mounting in step a) involves placing the first ring flange part 5a and the second ring flange part 5b around the armoured high voltage cable C.

Optionally, prior to mounting the ring flange 5, the thermal protection system 13 may be placed around the section that is free from armour wires.

In a step b) the armour wires W of the armoured high voltage cable C are welded to the first armour attachment surface 5c of the ring flange 5 and armour wires of the armoured high voltage cable are welded to the second armour attachment surface 5d of the ring flange 5.

In a step c) the first tapering reinforcement member 9 is mounted around the first armour attachment surface 5c. The first tapering reinforcement member 9 is mounted by means of bringing together its lengthwise splittable parts over the armoured high voltage cable C.

In a step d) the first tapering reinforcement member 9 is attached to the first flange surface 7a of the ring flange 5.

In a step e) the second tapering reinforcement member 11 is mounted around the second armour attachment surface 5d. The second tapering reinforcement member 11 is mounted by means of bringing together its lengthwise splittable parts over the armoured high voltage cable C.

In steps c) and e) each of the first tapering reinforcement member 9 and the second tapering reinforcement member 11 may be mounted to be splittable lengthwise in a respective plane P2 each of which is at an angle, for example in the range 10-90 degrees, or 45-90 degrees, or about 90 degrees, or 90 degrees, relative to a first plane P1 in which the ring flange 5 is splittable lengthwise.

In a step f) the second tapering reinforcement member 11 is attached to the second flange surface 7b of the ring flange 5, opposite to the first flange surface 7a.

The first tapering reinforcement member 9 and the second tapering reinforcement member 11 are used to retain the ring flange 5 in position, because according to one variation the first ring flange part 5a and the second ring flange part 5b are not fixedly assembled with each other.

According to one variation the first ring flange part 5a and the second ring flange part 5b are held fixed by means of a fixture during the welding process so that the ring flange parts 5*a* and 5*b* maintain their position during the welding process. Alternatively, according to one variation the first ring flange part 5*a* may have studs, heels or lugs provided on the edges arranged to meet the edges of the second ring flange part 5*b* when bringing the first ring flange part 5*a* together with the second ring flange part 5*b*. The studs, heels or lugs may be arranged to slide into corresponding openings in the edges of the second ring flange part 5*b*. This ensures that the ring flange 5 will remain in a fixed position during welding.

In a step g) the casing 3 is mounted around the first tapering reinforcement member 9 and around the second tapering reinforcement member 11. The casing 3 is mounted around the first tapering reinforcement member 9 and the second tapering reinforcement member 11 by bringing together its lengthwise splittable parts over the armoured high voltage cable C.

The armoured high voltage cable C is thus ready to be actuated by means of the temporary load securing device 1 to which e.g. a crane may be connected for manoeuvring the armoured high voltage cable C.

The temporary load securing device 1 may be assembled with an armoured high voltage cable before the armoured high voltage cable is loaded onto a marine vessel, e.g. onto a cable carousel. Alternatively, temporary load securing device 1 may be mounted to the armoured high voltage cable when it has been loaded onto the marine vessel. The temporary load securing device 1 may be mounted at an end portion of the armoured high voltage cable, for example within 1-10 metres from the cable end, or anywhere else along the armoured high voltage cable.

The casing 3 may be removed from the armoured high voltage cable when the temporary load securing device 1 is not in use, in order to make the temporary load securing device smoother such that the risk of engagement with any external object is minimised. For this purpose, in variations in which the first tapering reinforcement member 9 has the first circumferential groove and the second tapering reinforcement member 11 has the second circumferential groove, these two circumferential grooves may be temporarily filled with a filler material, e.g. a plastic, thereby further smoothing the surface of the temporary load securing device 1 as long as the casing 3 is not arranged around the first tapering reinforcement member and the second tapering reinforcement member.

The temporary load securing device is made of a material which exhibits high mechanical strength such as metal, for example galvanised steel, aluminium or stainless steel. The material which the ring flange is made of typically depends on the material used for the armour wires of the armoured high voltage cable. Normally, the armour wires, the ring flange 5, the first tapering reinforcement member and the second reinforcement member are made of the same material in order to facilitate the welding procedure and to reduce the risk of galvanised corrosion.

The temporary load securing device described herein functions as a multi-purpose tool adapted to be utilised in a plurality of different situations involved in for example offshore cable installation at an offshore structure, for example for lifting, joining, pulling, securing and fastening of an armoured subsea power cable.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A temporary load securing device made of metal, for armoured high voltage cables (C), wherein the temporary load securing device comprises:
   a ring flange splittable lengthwise, which ring flange has a first armour attachment surface and a second armour attachment surface for welding armour wires (W) of the armoured high voltage cable (C) to the ring flange, wherein the first armour attachment surface extends in a first essentially axial direction, and the second armour attachment surface extends in a second essentially axial direction, opposite to the first essentially axial direction,
   a first tapering reinforcement member splittable lengthwise, designed to be mounted around an armoured high voltage cable (C) and around the first armour attachment surface, and which first tapering reinforcement member is arranged to be attached to a first flange surface of the ring flange, thereby extending in a first axial direction away from the first flange surface,
   a second tapering reinforcement member splittable lengthwise, designed to be mounted around an armoured high voltage cable (C) and around the second armour attachment surface, and which second tapering reinforcement member is arranged to be attached to a second flange surface of the ring flange, opposite to the first flange surface, thereby extending in a second axial direction, opposite to the first direction, away from the second flange surface, and
   a casing splittable lengthwise, which casing is mountable around the first tapering reinforcement member and around the second tapering reinforcement member, and which casing has engagement means for lifting the temporary load securing device.

2. The temporary load securing device according to claim 1, wherein in a mounted state the ring flange is splittable lengthwise in a first plane (P1) and each of the first tapering reinforcement member and the second reinforcement member is splittable lengthwise in a respective plane (P2) each of which is at an angle relative to the first plane (P1).

3. The temporary load securing device according to claim 2, wherein the casing is rotatably engageable with the first tapering reinforcement member and the second tapering reinforcement member, to thereby enable relative rotation between the casing and the first reinforcement member and between the casing and the second reinforcement member.

4. The temporary load securing device according to claim 2, wherein a plurality of axial grooves is distributed along the entire periphery of the ring flange.

5. The temporary load securing device according to claim 2, including a thermal protection system arranged to be mounted around the armoured high voltage cable (C), and wherein the ring flange is arranged to be mounted around the thermal protection system.

6. The temporary load securing device according to claim 2, wherein the first tapering reinforcement member is mountable to the first flange surface by means of a plurality of bolts and the second tapering reinforcement member is mountable to the second flange surface by means of plurality of bolts.

7. The temporary load securing device according to claim 1, wherein the casing is rotatably engageable with the first tapering reinforcement member- and the second tapering reinforcement member, to thereby enable relative rotation between the casing and the first reinforcement member and between the casing and the second reinforcement member.

8. The temporary load securing device according to claim 7, wherein the first tapering reinforcement member has a first circumferential groove and the second tapering reinforcement members has a second circumferential groove, wherein the casing is arranged to rotatably engage with the first circumferential groove and with the second circumferential groove to enable the relative rotation.

9. The temporary load securing device according to claim 1, wherein a plurality of axial grooves is distributed along the entire periphery of the ring flange.

10. The temporary load securing device according to claim 9, including a locking member which is mountable to the casing and engageable with any of the axial grooves of the ring flange to lock relative rotation between the casing and the ring flange and thereby prevent relative rotation between the casing and each of the first tapering reinforcement member and the second reinforcement member.

11. The temporary load securing device according to claim 1, including a thermal protection system arranged to be mounted around the armoured high voltage cable (C), and wherein the ring flange is arranged to be mounted around the thermal protection system.

12. The temporary load securing device according to claim 1, wherein the first tapering reinforcement member is mountable to the first flange surface by means of a plurality of bolts and the second tapering reinforcement member is mountable to the second flange surface by means of plurality of bolts.

13. A method for facilitating installation-related operations of an armoured high voltage cable (C), wherein the method includes:
mounting a temporary load securing device made of metal around an armoured high voltage cable, including the steps of:
a) mounting a ring flange that is split lengthwise around an armoured high voltage cable (C),
b) welding armour wires (W) of the armoured high voltage cable (C) to a first armour attachment surface of the ring flange, the first armour attachment surface extending in a first essentially axial direction and welding armour wires (W) of the armoured high voltage cable (C) to a second armour attachment surface of the ring flange, the second armour attachment surface extending in a second essentially axial direction, opposite to the first essentially axial direction,
c) mounting a first tapering reinforcement member that is split lengthwise, around the first armour attachment surface,
d) attaching the first tapering reinforcement member to a first flange surface of the ring flange, whereby the first tapering reinforcement member extends in a first axial direction away from the first flange surface,
e) mounting a second tapering reinforcement member that is split lengthwise, around the second armour attachment surface,
f) attaching the second tapering reinforcement member to a second flange surface of the ring flange, opposite to the first flange surface, whereby the second tapering reinforcement member extends in a second axial direction, away from the second flange surface, and
g) mounting a casing, having engagement means for lifting the temporary load securing device, and which casing is split lengthwise, around the first tapering reinforcement member and around the second tapering reinforcement member.

14. The method according to claim 13, including attaching to the engagement means a first hook of a crane and attaching a second hook of a crane.

15. The method according to claim 14, wherein in steps c) and e) each of the first tapering reinforcement member and the second tapering reinforcement member is mounted to be splittable lengthwise in a respective plane (P2) each of which is at an angle relative to a first plane (P1) in which the ring flange is splittable lengthwise.

16. The method according to claim 14, wherein a plurality of axial grooves is distributed along the entire periphery of the ring flange, and wherein the method includes mounting a locking member onto the casing, and engaging the locking member with an axial groove to lock relative rotation between the casing and the ring flange and thereby prevent relative rotation between the casing and each of the first tapering reinforcement member and the second reinforcement member.

17. The method according to claim 14, including holding the armoured high voltage cable (C) by means of the crane.

18. The method according to claim 13, wherein in steps c) and e) each of the first tapering reinforcement member and the second tapering reinforcement member is mounted to be splittable lengthwise in a respective plane (P2) each of which is at an angle relative to a first plane (P1) in which the ring flange is splittable lengthwise.

19. The method according to claim 13, wherein a plurality of axial grooves is distributed along the entire periphery of the ring flange, and wherein the method includes mounting a locking member onto the casing, and engaging the locking member with an axial groove to lock relative rotation between the casing and the ring flange and thereby prevent relative rotation between the casing and each of the first tapering reinforcement member and the second reinforcement member.

* * * * *